(12) United States Patent
Matsuzawa et al.

(10) Patent No.: US 11,206,760 B2
(45) Date of Patent: Dec. 28, 2021

(54) UTILITY VEHICLE WITH SPRING SUSPENSION BETWEEN COVER AND CHASSIS

(71) Applicant: HONDA MOTOR CO., LTD., Tokyo (JP)

(72) Inventors: Kohei Matsuzawa, Wako (JP); Koji Kasai, Wako (JP); Takahide Konchi, Wako (JP); Takeshi Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 359 days.

(21) Appl. No.: 16/473,542

(22) PCT Filed: Dec. 13, 2017

(86) PCT No.: PCT/JP2017/044773
§ 371 (c)(1),
(2) Date: Jun. 25, 2019

(87) PCT Pub. No.: WO2018/123597
PCT Pub. Date: Jul. 5, 2018

(65) Prior Publication Data
US 2020/0000028 A1    Jan. 2, 2020

(30) Foreign Application Priority Data
Dec. 27, 2016    (JP) .............................. JP2016-253718

(51) Int. Cl.
*A01D 34/81*    (2006.01)
*A01D 34/00*    (2006.01)
(Continued)

(52) U.S. Cl.
CPC ........... *A01D 34/81* (2013.01); *A01D 34/008* (2013.01); *A01D 34/64* (2013.01); *A01D 34/68* (2013.01);
(Continued)

(58) Field of Classification Search
CPC ...... A01D 34/81; A01D 34/008; A01D 34/64; A01D 34/68; A01D 67/00; B60G 11/52; B60G 11/54; B60G 99/02
See application file for complete search history.

(56) References Cited

U.S. PATENT DOCUMENTS

| | | | | |
|---|---|---|---|---|
| 3,165,306 A | * | 1/1965 | Tea | B60G 15/065 267/220 |
| 6,913,253 B2 | * | 7/2005 | Mennesson | B60G 11/52 188/321.11 |
| 2018/0271014 A1 | | 9/2018 | Matsuzawa et al. | |

FOREIGN PATENT DOCUMENTS

| | | |
|---|---|---|
| EP | 2 687 077 A2 | 1/2014 |
| EP | 2 692 220 A1 | 2/2014 |

(Continued)

OTHER PUBLICATIONS

International Search Report (PCT/ISA/210) issued in PCT/JP2017/044773, dated Mar. 13, 2018.

*Primary Examiner* — Alicia Torres
(74) *Attorney, Agent, or Firm* — Birch, Stewart, Kolasch & Birch, LLP (57) ABSTRACT

A utility vehicle equipped with a cover displaceably attached to a chassis through a suspension mechanism, each suspension mechanism includes a shaft installed between the chassis and cover, a guide member having a plate member provided on lower half of the shaft and multiple plates installed above and below the plate member to be contactable with the plate member and respectively formed at their centers with through holes for passage of the shaft, a
(Continued)

compression spring of roughly frustoconical shape for biasing the cover toward the chassis whose upper seating edge is attached to upper half of the shaft and lower seating edge is attached to periphery of the through hole of the cover, and an elastic member of roughly frustoconical shape formed at its center with a through hole to pass the shaft therethrough, wherein the cover is formed in roughly frustoconical shape similar to the elastic member.

10 Claims, 4 Drawing Sheets

(51) Int. Cl.
    *B60G 99/00*    (2010.01)
    *A01D 34/64*    (2006.01)
    *A01D 34/68*    (2006.01)
    *A01D 67/00*    (2006.01)
    *B60G 11/52*    (2006.01)
    *B60G 11/54*    (2006.01)

(52) U.S. Cl.
    CPC .............. *A01D 67/00* (2013.01); *B60G 11/52* (2013.01); *B60G 11/54* (2013.01); *B60G 99/002* (2013.01)

(56) References Cited

FOREIGN PATENT DOCUMENTS

| | | |
|---|---|---|
| JP | 2016-158594 A | 9/2016 |
| WO | WO 03/103375 A1 | 12/2003 |
| WO | WO 2013/125992 A1 | 8/2013 |
| WO | WO 2017/109879 A1 | 6/2017 |

* cited by examiner

UTILITY VEHICLE WITH SPRING SUSPENSION BETWEEN COVER AND CHASSIS

TECHNICAL FIELD

This invention relates to a utility vehicle.

BACKGROUND ART

Among utility vehicles are known vehicles equipped with one or more suspension mechanisms for displaceably attaching a cover to a chassis, and Applicant also earlier proposed a structure of this type in Patent Document 1.

The suspension mechanism taught by Patent Document 1 is equipped with a body installed to extend in gravity axis direction between a chassis and a cover and a guide member for guiding force acting on the body to horizontal motion orthogonal to the gravity axis direction, and is configured so that horizontal displacement of the cover can be set large and noise can be reduced by inhibiting vibration of the cover during vehicle running.

PRIOR ART DOCUMENT

Patent Document

Patent Document 1: International Publication WO/2017/109879 A1

SUMMARY OF THE INVENTION

Problem to be Solved by the Invention

The object of this invention is the same as that of Patent Document 1, namely, to provide a utility vehicle adapted so that horizontal displacement of a cover can be set large and noise caused by vibration of the cover during running can be inhibited.

Means for Solving the Problem

In order to achieve the object mentioned above, in the utility vehicle according to the invention, which is equipped with a cover displaceably attached to a chassis through a suspension mechanisms, each suspension mechanism comprises: a shaft installed between the chassis and the cover so that its axis lies in gravity axis direction, its upper half passes through a through hole formed in the cover to extend upward of the cover and its lower half extends toward the chassis; a guide member having a plate member provided on lower half of the shaft and multiple plates installed above and below the plate member in gravity axis direction to be contactable with the plate member and respectively formed at their centers with the through holes for passage of the shaft; a compression spring of roughly frustoconical shape for biasing the cover toward the chassis whose upper seating edge is attached to upper half of the shaft and lower seating edge is attached to periphery of the through hole of the cover; and an elastic member of roughly frustoconical shape formed at its center with a through hole and installed in gravity axis direction between the cover and the guide member to pass the shaft through the through hole; wherein the cover is configured to be formed in roughly frustoconical shape similar to the elastic member.

Effects of the Invention

Since the utility vehicle according to the invention is configured to have the shaft installed between the chassis and the cover so that its axis lies in gravity axis direction, the guide member having the plate member provided on lower half of the shaft and multiple plates installed above and below the plate member to be contactable with the plate member and respectively formed at their centers with the through holes for passage of the shaft, and the compression spring for biasing the cover toward the chassis, in the guide member the plate member provided on the shaft comes to slide in contact with the multiple plates of the guide members, whereby external force acting on the shaft can be guided (or converted) to displacement in horizontal axis direction orthogonal to gravity axis direction. Moreover, since the guide member comprises the plate member and the plates installed above and below the plate member to be contactable therewith, and since it comes to be flat members that are contacted with each other, amount of horizontal displacement of the cover can therefore be set large.

Moreover, since the compression spring is formed to have roughly frustoconical shape enabling attachment of the upper seating edge to upper half of the shaft and attachment of the lower seating edge to periphery of the through hole of the cover, and the elastic member is also formed to have roughly frustoconical shape and the cover is also formed in roughly frustoconical shape similar to the elastic member, by which configuration contact area between the elastic member and the cover can be enlarged to effectively inhibit vibration of the cover when the vehicle is running, so that noise caused by vibration of the cover when the vehicle is running can be minimized.

MODE FOR CARRYING OUT THE INVENTION

Figure 1:
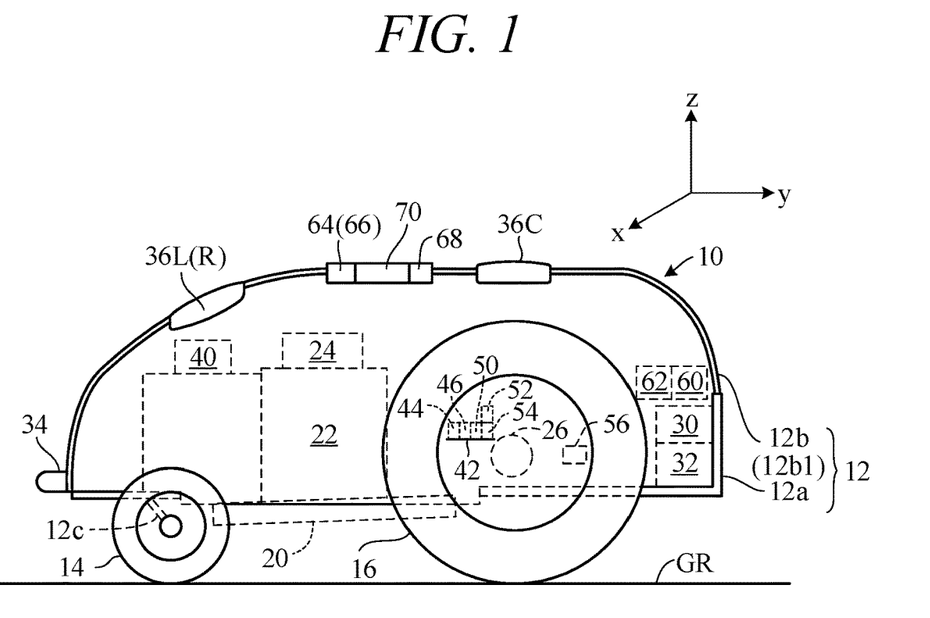
FIG. 1 is a conceptual diagram showing an overview of a utility vehicle in accordance with an embodiment of this invention.
Figure 2:
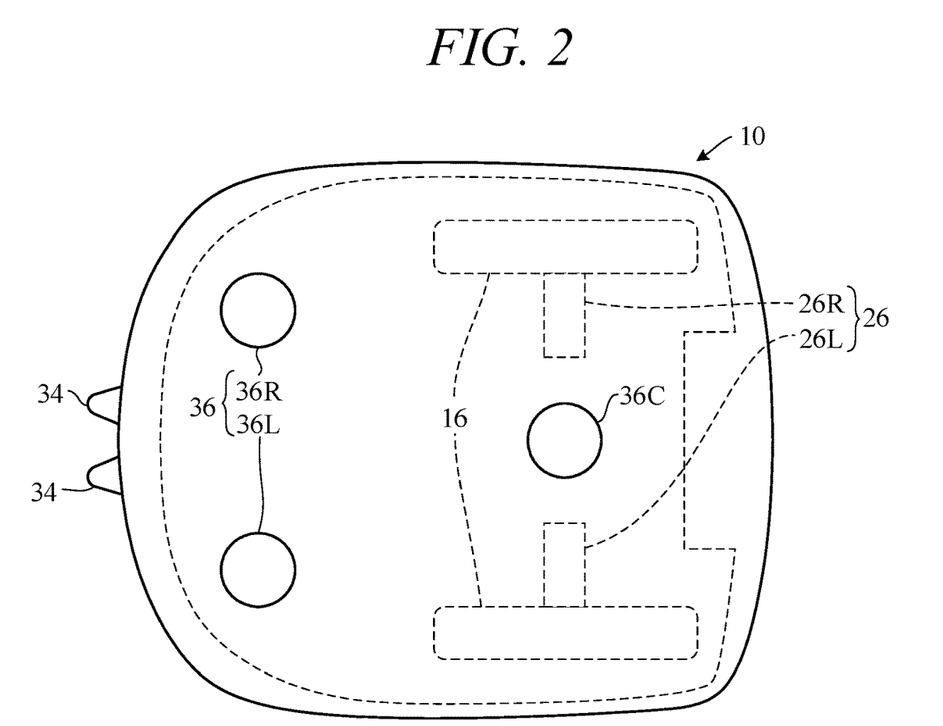
FIG. 2 is a top view of the utility vehicle of FIG. 1.
Figure 3:
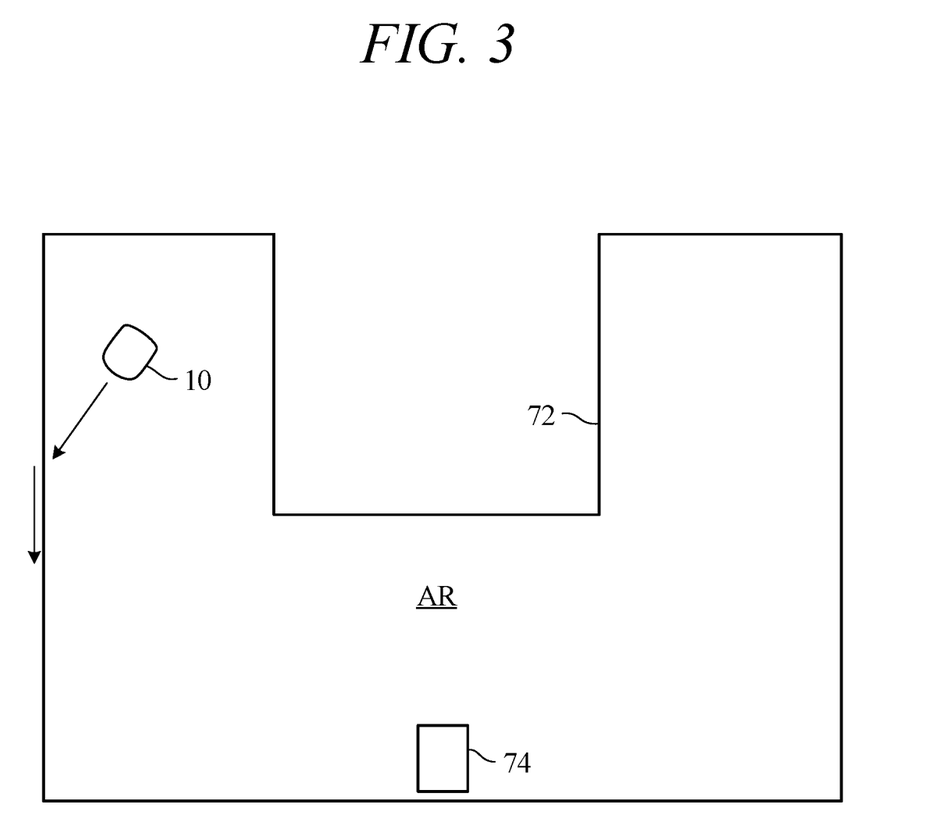
FIG. 3 is a plan view of a work area serviced by utility vehicle of FIG. 1.
Figure 4:
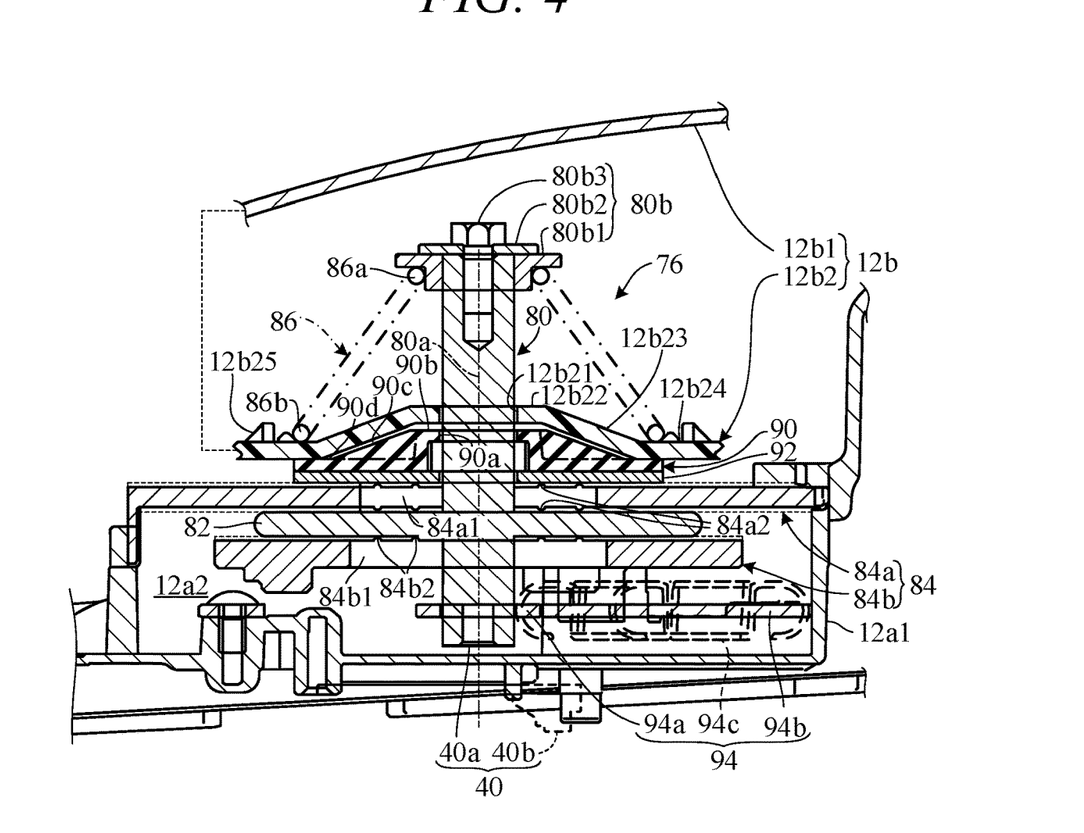
FIG. 4 is a cross-sectional diagram of a suspension mechanism of the utility vehicle of FIG. 1.
Figure 5:
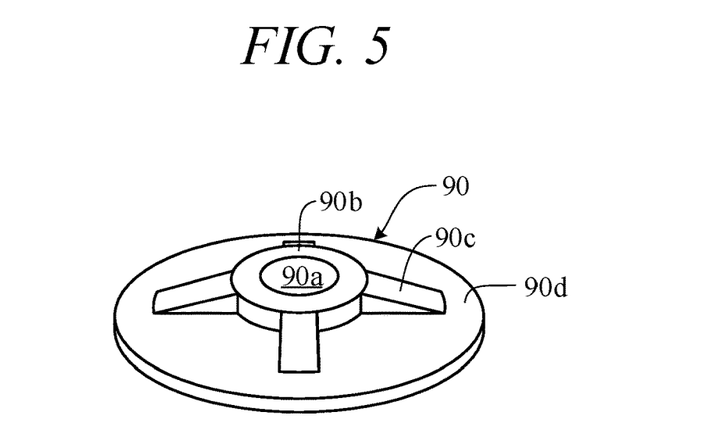
FIG. 5 is a perspective diagram of an elastic member of the suspension mechanism of FIG. 4.
Figure 6:
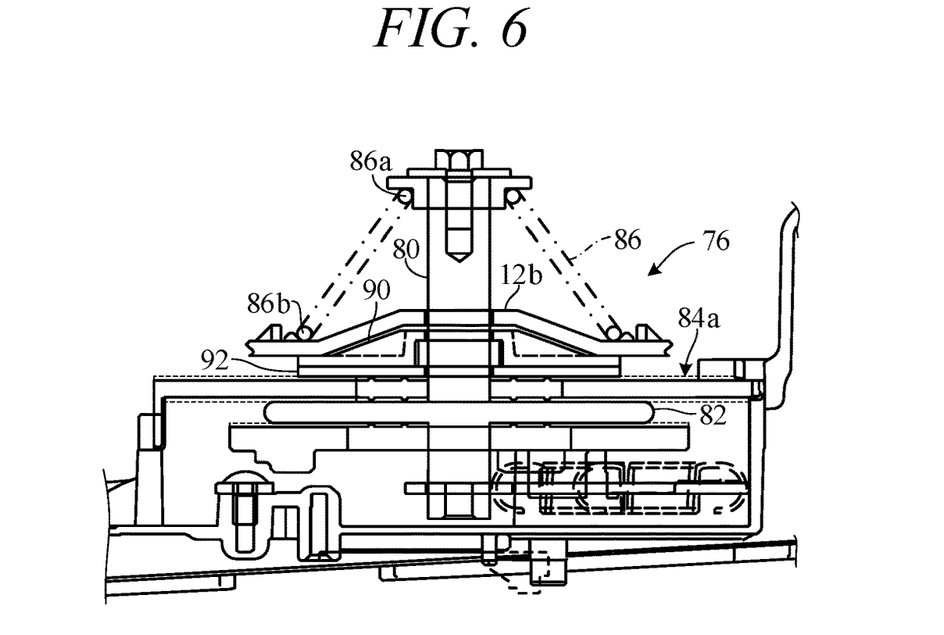
FIG. 6 is a side views of the suspension mechanism of FIG. 4.
Figure 7:
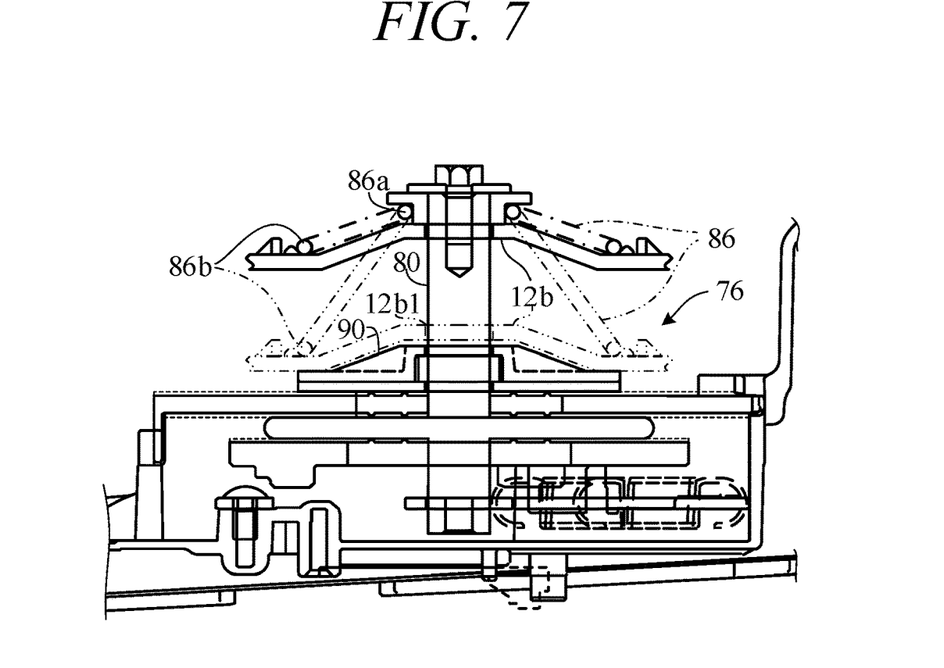
FIG. 7 is also a side views of the suspension mechanism of FIG. 4.

FIG. 1 is a conceptual diagram showing an overview of a utility vehicle in accordance with an embodiment of this invention; FIG. 2 is a top view of the utility vehicle of FIG. 1; FIG. 3 is a plan view of a work area serviced by utility vehicle of FIG. 1; FIG. 4 is a cross-sectional diagram of a suspension mechanism of the utility vehicle of FIG. 1; FIG. 5 is a perspective diagram of an elastic member of the suspension mechanism of FIG. 4; and FIGS. 6 and 7 are side views of the suspension mechanism of FIG. 4.

Symbol 10 in FIG. 1 and other drawings designates a utility vehicle (called simply "vehicle" below). The vehicle 10 is an unmanned autonomously navigating vehicle, actually a lawn mower. A body 12 of the vehicle 10 comprises a chassis (body frame) 12*a* and a cover 12*b* displaceably attached to the chassis 12*a*.

More specifically, the cover 12*b* comprises an outer cover 12*b*1 (shown in FIGS. 1 and 4) and inner cover 12*b*2 (shown in FIG. 4) attached to the outer cover 12*b*1 through a locking member (not shown).

The vehicle 10 is equipped with two laterally (left-right) spaced front wheels 14 of relatively small diameter fixed through stays 12c to longitudinal (front-back) front end of the chassis 12a and with laterally spaced rear wheels 16 of relatively large diameter directly attached to rear end of the chassis 12a.

A lawn mower work blade (work unit, specifically a rotary blade) 20 is attached to the chassis 12a of the vehicle 10 at a lower part near the middle thereof, and an electric motor (prime mover; hereinafter called "work motor") 22 is installed above it. The blade 20 is connected to the work motor 22 and driven to rotate by the work motor 22.

A blade height regulation mechanism 24 manually operable by a user is connected to the blade 20. The blade height regulation mechanism 24 is equipped with a handle operable by the user, and the user can regulate height of the blade 20 above ground surface GR by manually rotating the handle.

Two electric motors (prime movers; hereinafter called "drive motors") 26L and 26R are attached to the chassis 12a of the vehicle 10 rearward of the blade 20. The drive motors 26L and 26R are connected to the left and right rear wheels 16 and are rotated normally (rotated to move forward) or reversely (rotated to move backward) independently on the left and right, with the front wheels 14 as non-driven wheels and the rear wheels 16 as driven wheels. The blade 20, work motor 22, drive motors 26 and so on are covered by the cover 12b.

In this embodiment, the vehicle 10 is of such weight and size as to be portable by the user. For example, the vehicle 10 has a total length (fore-aft length) of about 71 cm, total width about 55 cm, and height about 30 cm.

An onboard charging unit 30 and an onboard battery 32 connected thereto are housed at the rear of the vehicle 10, and two battery charging terminals 34 are attached to the chassis 12a so as to project forward from a front end position. The battery charging terminals 34 are connected to the onboard charging unit 30. The work motor 22 and drive motors 26 are also connected to the onboard battery 32 and are powered by the onboard battery 32.

Left and right magnetic sensors 36L and 36R are installed toward the front end of the body 12 of the vehicle 10 and a single magnetic sensor 36C is installed toward the rear end. The magnetic sensors 36 independently output signals indicating magnetic field strength.

A contact sensor 40 is attached to the body 12 to produce an output indicating displacement between the cover 12b and the chassis 12a caused by contact of the vehicle 10 with an obstacle or foreign object. The contact sensor 40 is explained in detail below.

A housing box installed near the middle of the chassis 12a houses a printed circuit board 42 carrying an electronic control unit (hereinafter called "ECU") 44, which comprises a microcomputer equipped with a CPU (processor), I/O, memory (ROM, EEPROM and RAM) and other components.

The printed circuit board 42 is further provided thereon, in the vicinity of the ECU 44, with an angular velocity sensor 46 that generates an output indicating angular velocity (i.e., yaw rate) around a center-of-gravity z-axis (i.e., gravity axis) of the vehicle 10, an acceleration sensor 50 that generates an output indicating acceleration acting on the vehicle 10 in orthogonal three-axis (x, y and z) directions, a direction or orientation sensor 52 that generates an output indicating absolute orientation in response to terrestrial magnetism, and a GPS sensor 54 that receives radio waves from GPS satellites and generates an output indicting current position of the vehicle 10.

Wheel speed sensors 56 installed near the left and right rear wheels 16 of the vehicle 10 generate outputs indicating wheel speeds of the left and right rear wheels 16, and a lift sensor 60 installed between the chassis 12a and the cover 12b detects lifting of the cover 12b off the chassis 12a by someone such as the user. A current sensor 62 installed on the onboard battery 32 generates an output indicating consumption of onboard battery 32 current.

The utility vehicle 10 is equipped with a main switch 64 for instructing start of work operation and the like and an emergency stop switch 66 for instructing emergency stop, both of which are operable by the user. In addition, the cover 12b, more exactly the top of the outer cover 12b1, has a large cutaway in which a keyboard, touch panel or other input device 68 is installed for inputting of instructions and the like by the user, and a display 70 is installed near the input device 68. The input device 68 and the display 70 are connected to the ECU 44, and the display 70 displays working modes and other various information in accordance with commands from the ECU 44.

The outputs of the magnetic sensors 36, contact sensor 40, angular velocity sensor 46 and other sensors, and the outputs of the main switch 64 and other switches are sent to the ECU 44. Based on these outputs, the CPU in the ECU 44 applies power from the onboard battery 32 to the drive motors 26 and outputs control values to control running of the vehicle 10 by controlling operation of the drive motors 26. Moreover, as elaborated later, the CPU detects contact of the vehicle 10 with an obstacle from output of the contact sensor 40.

The CPU in the ECU 44 detects (or recognizes) a working area AR from the outputs of the magnetic sensors 36 and accordingly applies power to the work motor 22 so as to service the working area AR.

As shown in FIG. 3, the working area AR is delineated by a boundary wire (electrical wire) 72 laid around its periphery (or boundary). A charging station 74 for charging the onboard battery 32 of the vehicle 10 is installed in the working area AR. (In FIG. 3, sizes of the vehicle 10 and so on are exaggerated.)

As a characterizing feature of this invention resides in structure of a suspension mechanism of the vehicle 10 configured as set out above, this structure is explained with reference to FIG. 4 and ensuing drawings in the following.

FIG. 4 is a cross-sectional diagram of the suspension mechanism (designated by symbol 76) of the utility vehicle 10 shown in FIG. 1

Although not illustrated, a total of three suspension mechanisms 76 are installed, one above the front wheels 14 of the vehicle 10 and two at laterally spaced positions above the rear wheels 16. The one illustrated in FIG. 4 is structured for installation above the front wheels 14.

As illustrated, the vehicle 10 is equipped with the cover 12b displaceably attached to the chassis 12a through the suspension mechanisms 76, and each suspension mechanism 76 is equipped with a shaft 80, a guide member 84 comprising a plate member 82 and multiple plates 84a and 84b, a compression spring 86, and an elastic member 90.

As mentioned earlier, the cover 12b includes the outer cover 12b1 and the inner cover 12b2, but since these are physically connected through a locking member, they are substantially one and the same cover. In the ensuing explanation, the outer and inner covers are in combination called "cover 12b", but in FIG. 4 and other drawings the cover 12b is actually indicated by the symbol 12b2 of the inner cover.

The shaft 80 is installed between the chassis 12a and the cover 12b with its axis 80a aligned in gravity axis direction.

The shaft 80 is configured to have its upper half pass through a through hole 12*b*21 formed in the cover 12*b* (more exactly, in the inner cover 12*b*2 thereof) and extends upward of the cover 12*b* in gravity axis direction and to have its lower half extend toward the chassis 12*a*.

As termed in this specification, "gravity axis direction" means direction of gravity axis (i.e., vertical axis direction; z-axis direction) in an orthogonal coordinate system when the vehicle 10 is resting on ground surface GR as shown in FIG. 1.

As illustrated, the through hole 12*b*21 formed in the cover 12*b* is defined to have inner diameter only slightly greater than outer diameter of the shaft 80 so as to permit only vertical (gravity axis direction) displacement of the shaft 80.

The plate member 82 is provided on lower half of the shaft 80 integrally with the shaft 80, and although not illustrated, is of circular shape in plan view and of flat disk shape in side view. Optionally, the plate member 82 can be fabricated separately of the shaft 80 and thereafter formed with a central through hole into which the shaft 80 is integrally fitted.

The guide member 84 comprises the plate member 82 and multiple flat plates installed above and below the plate member 82 in gravity axis direction to be contactable with the plate member 82, specifically two plates, namely an upper side first plate (mount plate) 84*a* and a lower side second plate (mount washer) 84*b*. The first and second plates 84*a* and 84*b* are respectively formed with center through holes 84*a*1 and 84*b*1 for passage of the shaft 80.

As the plate member 82 provided on the shaft 80 therefore slides while contacting the two (upper and lower) plates 84*a* and 84*b* of the guide member 84, external force acting on the shaft 80 is guided (or converted) to displacement in horizontal axis direction orthogonal to gravity axis direction, more specifically, force (i.e., force and moment) acting on the shaft 80, particularly bending moment, is guided to motion in horizontal axis direction (i.e., xy-axis direction) orthogonal to gravity axis direction.

Continuing explanation of the guide member 84, an upper frame 12*a*1 of upward opening box shape in side view is provided on the chassis 12*a*. The upper side first plate (mount plate) 84*a* among the plates of the aforesaid guide member 84 is attached to opening edge of the upper frame 12*a*1. Although not illustrated, the first plate 84*a* is provided in plate-like flat shape exhibiting roughly rectangular shape in plan view.

As a result, an internal space 12*a*2 closed by the upper first plate 84*a* is formed inside the upper frame 12*a*1, and lower half of the shaft 80 is accommodated in the internal space 12*a*2.

The lower side second plate (mount washer) 84*b* is installed inside the internal space 12*a*2 at a position under the upper side first plate (mount washer) 84*a*. Although not illustrated, the second plate 84*b* is also of disk-like flat shape circular in plan view.

As illustrated, the through holes 84*a*1 and 84*b*1 formed at the centers of the first plates 84*a* and second 84*b* have inner diameters much larger than outer diameter of the shaft 80 in a configuration that allows the shaft 80 to swing utilizing the through holes 84*a*1 and 84*b*1.

Upper surface and under surface of the upper side first plate 84*a* are formed with ribs 84*a*2, and upper surface of the lower side second plate 84*b* is similarly formed with ribs 84*b*2. Although not illustrated in detail, the ribs 84*a*2 and 84*b*2 formed on the first and second plates 84*a* and 84*b* are mutually spaced ribs formed to extend radially (i.e., horizontally) in all directions from centers of the through holes 84*a*1 and 84*b*1.

The guide member 84 is thus structured so that the plate member 82 provided on the shaft 80 slides in contact with under surface of the upper side first plate 84*a* and upper surface of the lower side second plate 84*b*, thereby implementing a configuration whereby the first and second plates 84*a* and 84*b* collaborate with the plate member 82 to guide (or convert) external force acting on the shaft 80 to displacement in horizontal axis direction orthogonal to gravity axis direction.

Since the ribs 84*a*2 and 84*b*2 formed on surfaces of the upper side and lower side first and second plates 84*a* and 84*b* are mutually spaced ribs extending radially (i.e., horizontally) in all directions, sliding resistance of the plate member 82 with respect to the upper side and lower side first and second plates 84*a* and 84*b* under such circumstances can be reduced to enable smooth sliding of the plate member 82, whereby the first and second plates 84*a* and 84*b* can collaborate with the plate member 82 to effectively guide external force acting on the shaft 80 in horizontal direction.

Moreover, since the guide member 84 is configured to comprise the flat plate member 82 and the flat first and second plates 84*a* and 84*b* installed above and below the plate member 82 to be contactable therewith, it comes to be flat members that are contacted with each other, so that amount of horizontal displacement of the cover 12*b* can be set large.

As illustrated, the compression spring 86 is a coil spring exhibiting roughly frustoconical shape in side view, whose upper seating edge 86*a* is attached to upper half of the shaft 80 and lower seating edge 86*b* is attached to periphery of the through hole 12*b*21 formed in the cover 12*b*, whereby a configuration is established that biases the cover 12*b* toward the chassis 12*a*, more exactly toward the upper side first plate 84*a* that defines the internal space 12*a*2 of the upper frame 12*a*1 of the chassis 12*a*.

The elastic member 90, which is of roughly frustoconical shape in side view, is formed with a center through hole 90*a* and installed between the cover 12*b* and the guide member 84 (more exactly, the upper side first plate 84*a*) in gravity axis direction, with the shaft 80 passing through the center hole 90*a*.

The elastic member 90 is made of rubber, synthetic resin or other suitable elastic material and is formed around its center through hole 90*a* with an upper side flat region (i.e., upper seating edge) 90*b* that forms a raised edge region of the through hole 90*a*, sloped faces 90*c* sloping peripherally downward from the upper side flat region 90*b* and a lower side flat region (i.e., lower seating edge) 90*d* continuing from where the sloped faces 90*c* terminate.

As shown in FIG. 5, the sloped faces 90*c* of the elastic member 90 comprise four ridges extending radially from the upper side flat region 90*b* toward the lower side flat region 90*d* at equal angular intervals of 90°.

The cover 12*b* is also formed to have a roughly frustoconical shape similar to the elastic member 90 in side view and is formed around its center through hole 12*b*21 with an upper side flat region (i.e., upper seating edge) 12*b*22 that forms a raised edge region of the through hole 12*b*21, a sloped face 12*b*23 sloping peripherally downward from the upper side flat region 12*b*22 and a lower side flat region (i.e., lower seating edge) l2*b*24 continuing from where the sloped face 12*b*23 terminate.

As illustrated, a spring holder 12*b*25 constituted as a protrusion for receiving the lower seating edge 86*b* of the compression spring 86 is provided on the lower side flat region 12b24 of the cover 12b, and a spring holder 80b constituted as a protrusion for receiving the upper seating edge 86a of the compression spring 86 is provided on upper half of the shaft 80.

The spring holder 80b provided on upper half of the shaft 80 comprises a flange 80b1 fitted on upper end of the shaft 80 and a bolt 80b3 with a washer 80b2 that fastens the flange 80b1 in the illustrated position.

To be more precise, the lower seating edge 86b of the compression spring 86 is attached to periphery of through hole 12b21 of the cover 12b at a position corresponding to or greater than distance of separation in horizontal direction from center of the through hole 90a of the elastic member 90 (i.e., corresponding to the axis 80a of the shaft 80) to edge of the elastic member 90 (i.e., end of the lower side flat region 90d).

A lift washer 92 is interposed between under the elastic member 90 and the first plate 84a of the guide member 84. Although not observable in the drawing, the lift washer 92 is of disk-like shape circular in plan view and is formed with a through hole whose inner diameter slightly exceeds outer diameter of the shaft 80 and though which the shaft 80 is passed.

The lift washer 92 is configured to abut the first plate 84a of the of guide member 84 via the ribs 84a2 formed radially on upper surface thereof and can therefore smoothly slide on upper surface of the first plate 84a in accordance with position of the shaft 80.

A biasing member 94 for biasing the axis 80a of the shaft 80 to initial position (i.e., neutral position (illustrated upright position)) is installed under the guide member 84.

Although not illustrated in detail, the biasing member 94 is of roughly annular shape in plan view and comprises a small diameter ring member 94a having the shaft 80 passed through a center hole thereof, a large diameter ring member 94b, also of annular shape, fixed to the upper frame 12a1, and three tension coils 94c bridged between the small diameter ring member 94a and the large diameter ring member 94b at three sites equally spaced at 120°.

As the shaft 80 is pulled in three directions by the three tension coils 94c of the biasing member 94, a configuration is established such that the shaft 80 is constantly biased to initial position and when acted on by a force is again restored to initial position.

The aforesaid contact sensor 40 is positioned near the biasing member 94. The contact sensor 40 comprises a permanent magnet or other such magnetic (i.e., ferromagnetic) body 40a accommodated at lower end of the shaft 80 and a detection circuit 40b equipped with a Hall effect element or other such magnetic sensitive element and housed in a case located near the magnetic body 40a at a predetermined distance therefrom.

The CPU of the ECU 44 uses output from the contact sensor 40 indicating horizontal movement of the shaft 80 caused by the guide member 84 to detect displacement between the cover 12b and the chassis 12a, and determines whether or not the vehicle 10 struck a building, paving stone, animal, person or other obstacle.

Operation of the suspension mechanism 76 according this embodiment is explained in the following.

As described in the foregoing, a configuration is adopted that incorporates the shaft 80 installed between the chassis 12a and the cover 12b with the axis 80a in alignment with gravity axis direction, the guide member 84 comprising the plate member 82 provided on lower half thereof, and the first and second plates 84a and 84b installed at positions above and below the plate member 82 to be contactable with the plate member 82 and formed at their centers with the through holes 84a1 and 84b1 for passage of the shaft 80, and the compression spring 86 for biasing the cover 12b toward the chassis 12a, by which configuration, in the guide member 84, the plate member 82 provided on the shaft 80 comes to slide in contact with the upper and lower first and second plates 84a and 84b, whereby external force acting on the shaft 80 can be guided (or converted) to displacement in horizontal axis direction orthogonal to gravity axis direction. Moreover, since the guide member 84 is configured to comprise the plate member 82 and the first and second plates 84a and 84b installed above and below the plate member 82 to be contactable therewith, it comes to be flat members (82, 84a and 84b) that are contacted with each other and amount of horizontal displacement of the cover 12b can therefore be set large.

Moreover, a configuration is adopted wherein surfaces of the upper side and lower side first and second plates 84a and 84b of the guide member 84 are formed with the mutually spaced ribs 84a2 and 84b2 extending radially (or horizontally) in all directions from centers of the through holes 84a1 and 84b1, by which configuration sliding resistance of the plate member 82 with respect to the upper side and lower side first and second plates 84a and 84b can be reduced to enable smooth sliding of the plate member 82, whereby the first and second plates 84a and 84b can collaborate with the plate member 82 to effectively guide external force acting on the shaft 80 in horizontal direction.

Moreover, a configuration is adopted wherein the compression spring 86 is formed in roughly frustoconical shape to have its upper seating edge 86a attached to upper half of the shaft 80 and its lower seating edge 86b attached to periphery of the through hole 12b21 of the cover 12b, the elastic member 90 is also formed in roughly frustoconical shape, and the cover 12b is also formed in roughly frustoconical shape similar to the elastic member 90, by which configuration contact area between the elastic member 90 and the cover 12b can be enlarged to effectively inhibit vibration of the cover 12b when the vehicle 10 is running, so that load applied to the cover 12b from the compression spring 86 upon lifting of the cover 12b when the vehicle 10 is running can be dispersed to thereby enhance durability of the cover 12b.

Namely, as shown in FIG. 6, load at the lower seating edge 86b of the compression spring 86 presses the cover 12b and edge of the lift washer 92 onto the first plate 84a of the guide member 84, and since the shaft 80 is lifted upward as a result, it is pressed onto the first plate 84a through the plate member 82, thereby more effectively inhibiting vibration of the cover 12b when the vehicle 10 is running.

Moreover, a configuration is adopted wherein the compression spring 86 is a coil spring exhibiting roughly frustoconical shape in side view, whose upper seating edge 86a is attached to upper half of the shaft 80 and lower seating edge 86b is attached to periphery of the through hole 12b21 formed in the cover 12b, so that when the user, for example, lifts the cover 12b upward in gravity axis direction against biasing force (or load) of the compression spring 86, the compression spring 86 becomes roughly parallel to the cover 12b as see in side view in FIG. 7. Space around the compression spring 86 when the cover 12b is lifted can therefore be kept relatively small.

As set out above, in the utility vehicle 10 of this embodiment, which is equipped with the cover 12b displaceably attached to the chassis 12a through the suspension mechanisms 76, each suspension mechanism 76 comprises: the shaft 80 installed between the chassis 12*a* and the cover 12*b* so that its axis 80*a* lies in gravity axis direction, its upper half passes through the through hole 12*b*21 formed in the cover 12*b* to extend upward of the cover 12*b* and its lower half extends toward the chassis 12*a*; the guide member 84 having the plate member 82 provided on lower half of the shaft 80 and multiple plates 84 (first plate 84*a* and second plate 84*b*) installed above and below the plate member 82 in gravity axis direction to be contactable with the plate member 82 and respectively formed at their centers with the through holes 84*a*1 and 84*b*1 for passage of the shaft 80; the compression spring 86 of roughly frustoconical shape for biasing the cover 12*b* toward the chassis 12*a* whose upper seating edge 86*a* is attached to upper half of the shaft 80 and lower seating edge 86*b* is attached to periphery of the through hole 12*b*21 of the cover 12*b*; and the elastic member 90 of roughly frustoconical shape formed at its center with the through hole 90*a* and installed in gravity axis direction between the cover 12*b* and the guide member 84 to pass the shaft 80 through the through hole 90*a*; wherein the cover 12*b* is configured to be formed in roughly frustoconical shape similar to the elastic member 90. With this, in the guide member 84 the plate member 82 provided on the shaft 80 comes to slide in contact with the multiple plates 84*a* and 84*b* of the guide members 84, whereby external force acting on the shaft 80 can be guided (or converted) to displacement in horizontal axis direction orthogonal to gravity axis direction.

Moreover, a configuration is adopted wherein the guide member 84 has the plate member 82 and the first and second plates 84*a* and 84*b* installed above and below the plate member 82 to be contactable therewith, and since it comes to be flat members (82, 84*a* and 84*b*) that are contacted with each other, amount of horizontal displacement of the cover 12*b* can therefore be set large.

Moreover, a configuration is adopted wherein the compression spring 86 is formed to have roughly frustoconical shape enabling attachment of the upper seating edge 86*a* to upper half of the shaft 80 and attachment of the lower seating edge 86*b* to periphery of the through hole 12*b*21 of the cover 12*b*, the elastic member 90 is also formed to have roughly frustoconical shape and the cover 12*b* is also formed in roughly frustoconical shape similar to the elastic member 90, by which configuration contact area between the elastic member 90 and the cover 12*b* can be enlarged to effectively inhibit vibration of the cover 12*b* when the vehicle 10 is running, so that noise caused by vibration of the cover 12*b* when the vehicle 10 is running can be minimized.

Moreover, a configuration is adopted wherein the lower seating edge 86*b* of the compression spring 86 is attached to periphery of the through hole 12*b*21 of the cover 12*b* at a position corresponding to or greater than distance of separation in horizontal direction between center 90*a*1 of the through hole 90*a* of the elastic member 90 and the edge (edge of lower side flat region 90*d*), by which configuration contact area between the elastic member 90 and the cover 12*b* can be enlarged to still more effectively inhibit vibration of the cover 12*b* when the vehicle 10 is running.

Moreover, a configuration is adopted whereby the compression spring 86 becomes roughly parallel to the cover 12*b* in side view when the cover 12*b* is lifted upward in gravity axis direction against biasing force of the compression spring 86, so that, in addition to realizing the aforesaid effects, load applied to the cover 12*b* from the compression spring 86 upon lifting of the cover 12*b* can be dispersed to thereby enhance durability of the cover 12*b*.

Moreover, a configuration is adopted that is equipped with the biasing member 94 for biasing the axis 80*a* of the shaft 80 to initial position, thereby enabling horizontal displacement of the cover 12*b* to be set large and vibration of the cover 12*b* when the vehicle 10 is running to be more effectively inhibited.

Moreover, a configuration is adopted that is equipped with the contact sensor 40 for producing an output indicating displacement between the cover 12*b* and the chassis 12*a* in accordance with movement of the shaft 80 in horizontal direction, so that, in addition to realizing the aforesaid effects, contact with an obstacle can be easily detected from output of the contact sensor 40.

Although the vehicle 10 is exemplified in the foregoing as a vehicle that runs (i.e., autonomously navigates) while detecting magnetic field of the boundary wire 72 laid around the working area AR, the vehicle 10 is not limited to this type of vehicle.

Further, although the vehicle 10 is applied for use as a lawn mower vehicle, this invention is not limited to such an application and can also be applied to other utility vehicles.

Moreover, although a configuration is adopted wherein the multiple plates of the guide member 84 are two plates, namely the first plate 84*a* and the second plate 84*b*, installed above and below the plate member 82 to be capable of contacting the plate member 82, this is not a limitation and the guide member 84 can optionally comprise three or more plates.

DESCRIPTION OF SYMBOLS

10 utility vehicle (vehicle), 12 body, 12*a* chassis, 12*b* cover, 12*b*1 outer cover, 12*b*2 inner cover, 12*b*21 through hole, 12*b*22 upper side flat region, 12*b*23 sloped face, 12*b*24 lower side flat region, 12*b*25 spring folder, 14 front wheel, 16 rear wheel, 20 blade, 22 electric motor (work motor), 24 blade height regulation mechanism, 26 electric motor (drive motor), 30 onboard charging unit, 32 onboard battery, 34 battery charging terminal, 36 magnetic sensor, 40 contact sensor, 40*a* magnetic body, 40*b* detection circuit, 44 electronic control unit (ECU), 46 angular velocity sensor, 50 acceleration sensor, 52 direction sensor, 54 GPS sensor, 56 wheel speed sensor, 60 lift sensor, 62 current sensor, 68 input device, 70 display, 72 area wire, 74 charging station, 76 suspension mechanism, 80 shaft, 80*a* shaft axis, 80*b* spring holder, 80*b*1 flange, 80*b*2 washer, 80*b*3 bolt, 82 plate member, 84 guide member, 84*a* first plate (mount plate), 84*a*1 through hole, 84*a*2 rib, 84*b* second plate, 84*b*1 through hole, 84*b*2 rib, 86 compression spring, 86*a* upper seating edge, 86*b* lower seating edge, 90 elastic member, 90*a* through hole, 90*b* upper side flat region, 90*c* sloped face, 90*d* lower side flat region, 92 lift washer, 94 biasing member, 94*a*, 94*b* ring member, 94*c* tension coil, AR working area

The invention claimed is:

1. A utility vehicle, equipped with a chassis and a cover displaceably attached to the chassis through suspension mechanisms, each suspension mechanism, comprising:
   a shaft installed between the chassis and the cover so that the axis of the shaft lies in gravity axis direction, the upper half of the shaft passes through a through hole formed in the cover to extend upward of the cover and the lower half of the shaft extends toward the chassis;
   a guide member having a plate member provided on lower half of the shaft and multiple plates installed above and below the plate member in gravity axis direction to be contactable with the plate member and respectively formed at their centers with through holes for passage of the shaft;

a compression spring of roughly frustoconical shape for biasing the cover toward the chassis whose upper seating edge is attached to upper half of the shaft and whose lower seating edge is attached to periphery of the through hole of the cover; and an elastic member of roughly frustoconical shape formed at its center with a through hole and installed in gravity axis direction between the cover and the guide member to pass the shaft through the through hole;

wherein the cover is configured to be formed in roughly frustoconical shape similar to the elastic member.

2. The utility vehicle according to claim 1, wherein the lower seating edge of the compression spring is attached to periphery of the through hole of the cover at a position corresponding to or greater than distance of separation in horizontal direction between center of the through hole of the elastic member and its edge.

3. The utility vehicle according to claim 1, wherein the compression spring becomes roughly parallel to the cover in side view when the cover is lifted upward in gravity axis direction against biasing force of the compression spring.

4. The utility vehicle according to claim 1, further including:

a biasing member configured to bias the axis of the shaft to an initial position.

5. The utility vehicle according to claim 1, further including:

a contact sensor configured to produce an output indicating displacement between the cover and the chassis in accordance with movement of the shaft in horizontal direction.

6. The utility vehicle according to claim 1, wherein the cover comprises an outer cover and an inner cover is formed to have the roughly frustoconical shape similar to the elastic member.

7. The utility vehicle according to claim 1, wherein the vehicle has a plurality of wheels, and the suspension mechanisms are installed above the wheels.

8. The utility vehicle according to claim 1, wherein surfaces of the multiple plates facing the plate member are formed with ribs.

9. The utility vehicle according to claim 8, wherein the ribs are formed to extend radially from centers of the through holes.

10. The utility vehicle according to claim 1, wherein a lawn mower work blade is attached to the chassis of the vehicle.

* * * * *